US012652611B2

(12) United States Patent
Gupta et al.

(10) Patent No.: US 12,652,611 B2
(45) Date of Patent: Jun. 9, 2026

(54) SIGNALING OF NETWORK ACCESS PRIORITY

(71) Applicant: NOKIA TECHNOLOGIES OY, Espoo (FI)

(72) Inventors: Pallab Gupta, Bangalore (IN); Laurent Thiebaut, Antony (FR)

(73) Assignee: Nokia Technologies Oy, Espoo (FI)

( * ) Notice: Subject to any disclaimer, the term of this patent is extended or adjusted under 35 U.S.C. 154(b) by 589 days.

(21) Appl. No.: 18/100,868

(22) Filed: Jan. 24, 2023

(65) Prior Publication Data
US 2023/0247535 A1 Aug. 3, 2023

(30) Foreign Application Priority Data
Jan. 28, 2022 (IN) .............................. 202241004860

(51) Int. Cl.
*H04W 48/16* (2009.01)

(52) U.S. Cl.
CPC .................................. *H04W 48/16* (2013.01)

(58) Field of Classification Search
CPC ............................. H04W 48/16; H04L 43/062
See application file for complete search history.

(56) References Cited

U.S. PATENT DOCUMENTS

2021/0267000 A1 * 8/2021 Jain ....................... H04W 8/245

* cited by examiner

*Primary Examiner* — Diane D Mizrahi
(74) *Attorney, Agent, or Firm* — Nokia Technologies Oy

(57) ABSTRACT

Various example embodiments relate to signalling of network access priority. An apparatus may receive, at a first network, default network priority data indicative of a priority for accessing access network resources by a device. The apparatus may further receive, from a second network, auxiliary network priority data configured by the second network to override the default network priority data. The apparatus may cause configuration of network access for the device based on the auxiliary network priority data.

20 Claims, 4 Drawing Sheets

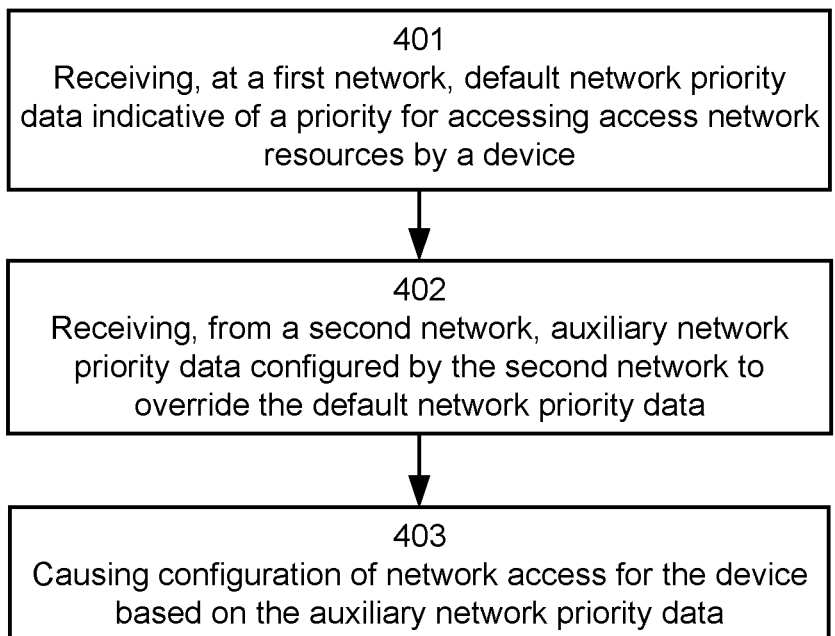

401
Receiving, at a first network, default network priority data indicative of a priority for accessing access network resources by a device

402
Receiving, from a second network, auxiliary network priority data configured by the second network to override the default network priority data

403
Causing configuration of network access for the device based on the auxiliary network priority data

FIG. 4

501
Determining, by a second network, default network priority data indicative of a priority for accessing access network resources by a device

502
Configuring auxiliary network priority data for overriding the default network priority data

503
Transmitting the auxiliary network priority data to a first network

FIG. 5

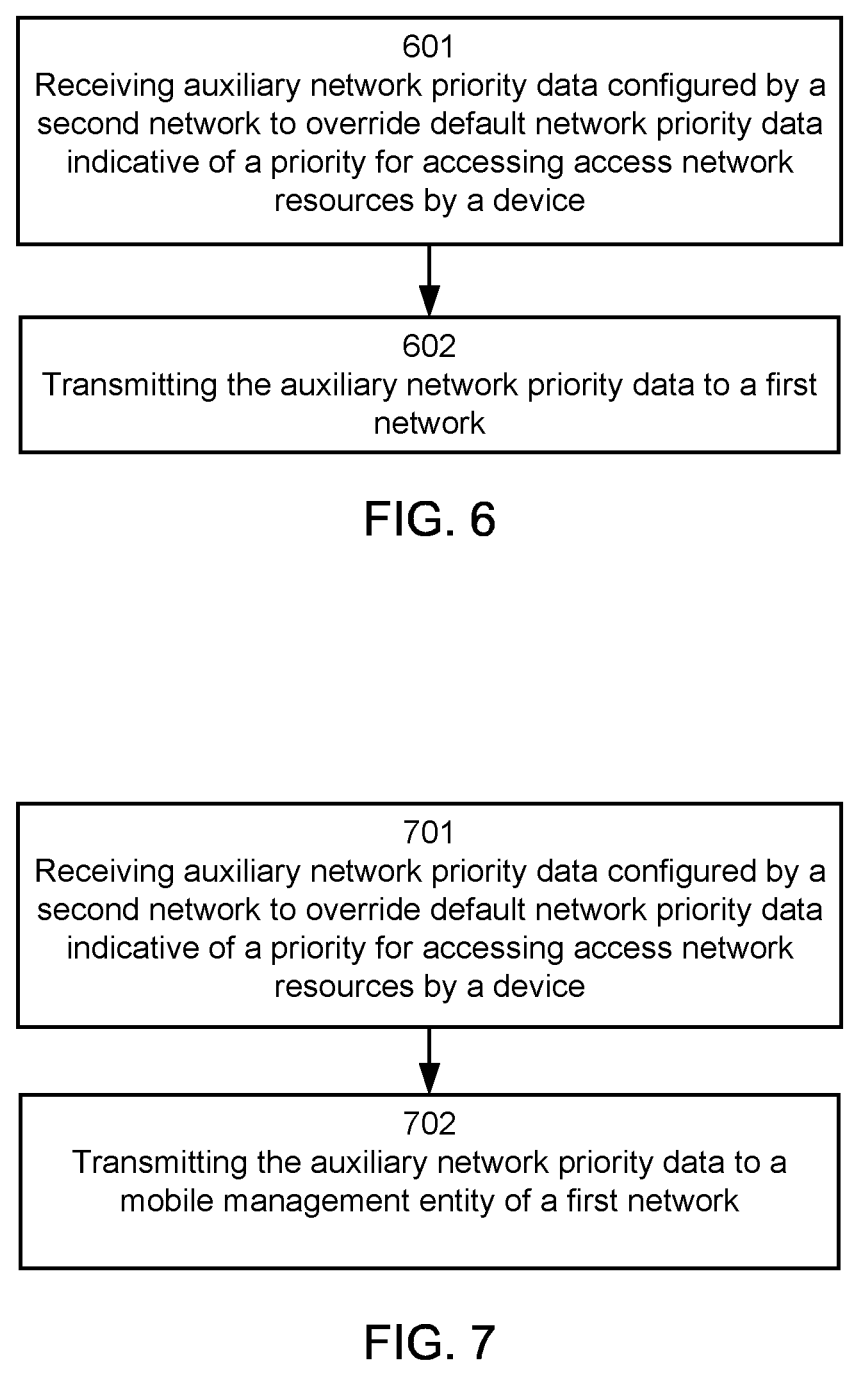

601
Receiving auxiliary network priority data configured by a
second network to override default network priority data
indicative of a priority for accessing access network
resources by a device 602
Transmitting the auxiliary network priority data to a first
network

FIG. 6

701
Receiving auxiliary network priority data configured by a
second network to override default network priority data
indicative of a priority for accessing access network
resources by a device 702
Transmitting the auxiliary network priority data to a
mobile management entity of a first network

FIG. 7

SIGNALING OF NETWORK ACCESS PRIORITY

CROSS REFERENCE TO RELATED APPLICATION

This application claims the benefit of Indian Patent Application No. 202241004860, filed Jan. 28, 2022. The entire content of the above-referenced application is hereby incorporated by reference.

TECHNICAL FIELD

Various example embodiments generally relate to the field of wireless communication networks. In particular, some example embodiments relate to signalling of network access priority between different networks.

BACKGROUND

Various wireless communication systems, such as for example the 5$^{th}$ generation (5G) system specified by the 3$^{rd}$ generation partnership project (3GPP), may be built on top of a core network, comprising for example a set of interconnected network functions (NF) for serving a user equipment (UE) via a radio access network (RAN). UE's may be however also capable of accessing services through other type of network(s), for example based on the 3GPP Long-Term Evolution (LTE) standards.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Example embodiments improve selection of an access network. This benefit may be achieved by the features of the independent claims. Further implementation forms are provided in the dependent claims, the description, and the drawings.

According to a first aspect, an apparatus may comprise at least one processor; and at least one memory including computer program code; the at least one memory and the computer program code configured to, with the at least one processor, cause the apparatus at least to: receive, at a first network, default network priority data indicative of a priority for accessing access network resources by a device; receive, from a second network, auxiliary network priority data configured by the second network to override the default network priority data; and cause configuration of network access for the device based on the auxiliary network priority data.

According to an example embodiment of the first aspect, the at least one memory and the computer code are further configured to, with the at least one processor, cause the apparatus to: determine a validity period for the auxiliary network priority data; and cause reconfiguration of network access for the device based on the default network priority data, in response to detecting expiry of the validity period.

According to an example embodiment of the first aspect, the at least one memory and the computer code are further configured to, with the at least one processor, cause the apparatus to: determine the validity period based on an indication of the validity period received from the second network.

According to an example embodiment of the first aspect, the apparatus comprises a mobility management entity of the first network.

According to an example embodiment of the first aspect, the at least one memory and the computer code are further configured to, with the at least one processor, cause the apparatus to: transmit the auxiliary network priority data and/or an indication of a remaining time of the validity period to a target mobility management entity of the first network, upon mobility of the device from the mobility management entity to the target mobility management entity.

According to an example embodiment of the first aspect, at least one of the default network priority data, the auxiliary network priority data, and the indication of the validity period is received from a home subscriber server.

According to an example embodiment of the first aspect, at least one of the auxiliary network priority data and the indication of the validity period is received from an access and mobility management function of the second network.

According to an example embodiment of the first aspect, at least one of the default network priority data, the auxiliary network priority data, and the indication of the validity period is received via/from a unified data management function of the second network.

According to an example embodiment of the first aspect, at least one of the default network priority data, the auxiliary network priority data, and the indication of the validity period is received in association with an attach or tracking area update procedure of the device to the first network or a subscriber data update procedure towards the first network.

According to an example embodiment of the first aspect, the default network priority data comprises a subscribed radio access technology or frequency selection policy index, and the auxiliary network priority data comprises an authorized radio access technology or frequency selection policy index configured by the second network.

According to an example embodiment of the first aspect, the first network comprises an evolved packet core network, and/or the second network comprises a 5G core network.

According to a second aspect, a method may comprise: receiving, at a first network, default network priority data indicative of a priority for accessing access network resources by a device; receiving, from a second network, auxiliary network priority data configured by the second network to override the default network priority data; and causing configuration of network access for the device based on the auxiliary network priority data.

According to an example embodiment of the second aspect, the method may further comprise: determining a validity period for the auxiliary network priority data; and causing reconfiguration of network access for the device based on the default network priority data, in response to detecting expiry of the validity period.

According to an example embodiment of the second aspect, the method may further comprise: determining the validity period based on an indication of the validity period received from the second network.

According to an example embodiment of the second aspect, the method may be performed by a mobility management entity of the first network.

According to an example embodiment of the second aspect, the method may further comprise: transmitting the auxiliary network priority data and/or an indication of a remaining time of the validity period to a target mobility management entity of the first network, upon mobility of the device from the mobility management entity to the target mobility management entity.

According to an example embodiment of the second aspect, at least one of the default network priority data, the auxiliary network priority data, and the indication of the validity period is received from a home subscriber server.

According to an example embodiment of the second aspect, at least one of the auxiliary network priority data and the indication of the validity period is received from an access and mobility management function of the second network.

According to an example embodiment of the second aspect, at least one of the default network priority data, the auxiliary network priority data, and the indication of the validity period is received via/from a unified data management function of the second network.

According to an example embodiment of the second aspect, at least one of the default network priority data, the auxiliary network priority data, and the indication of the validity period is received in association with an attach or tracking area update procedure of the device to the first network or a subscriber data update procedure towards the first network.

According to an example embodiment of the second aspect, the default network priority data comprises a subscribed radio access technology or frequency selection policy index, and the auxiliary network priority data comprises an authorized radio access technology or frequency selection policy index configured by the second network.

According to an example embodiment of the second aspect, the first network comprises an evolved packet core network, and/or the second network comprises a 5G core network.

According to a third aspect a computer program or a computer program product may comprise instructions for causing an apparatus to perform at least the following: receiving, at a first network, default network priority data indicative of a priority for accessing access network resources by a device; receiving, from a second network, auxiliary network priority data configured by the second network to override the default network priority data; and causing configuration of network access for the device based on the auxiliary network priority data. The computer program may further comprise instructions for causing the apparatus to perform any example embodiment of the method of the second aspect.

According to a fourth aspect an apparatus may comprise: means for receiving, at a first network, default network priority data indicative of a priority for accessing access network resources by a device; means for receiving, from a second network, auxiliary network priority data configured by the second network to override the default network priority data; and means for causing configuration of network access for the device based on the auxiliary network priority data. The apparatus may further comprise means for performing any example embodiment of the method of the second aspect.

According to a fifth aspect, an apparatus may comprise at least one processor; and at least one memory including computer program code; the at least one memory and the computer program code configured to, with the at least one processor, cause the apparatus at least to: determine, by a second network, default network priority data indicative of a priority for accessing access network resources by a device; configure auxiliary network priority data for overriding the default network priority data; and transmit the auxiliary network priority data to a first network.

According to an example embodiment of the fifth aspect, the at least one memory and the computer code are further configured to, with the at least one processor, cause the apparatus to: determine a validity period for the auxiliary network priority data; and transmit an indication of the validity period to the first network.

According to an example embodiment of the fifth aspect, the apparatus comprises an access and mobility management function of the second network, and at least one of the auxiliary network priority data and the indication of the validity period is transmitted to the first network via a unified data management function of the second network.

According to an example embodiment of the fifth aspect, at least one of the auxiliary network priority data and the indication of the validity period is transmitted to a mobility management entity of the first network.

According to an example embodiment of the fifth aspect, the at least one memory and the computer code are further configured to, with the at least one processor, cause the apparatus to: transmit at least one of the default network priority data, the auxiliary network priority data, and the indication of the validity period to another access and mobility management function of the second network upon mobility of the device from the access and mobility management function of the second network to the other access and mobility management function of the second network.

According to an example embodiment of the fifth aspect, at least one of the auxiliary network priority data and the indication of the validity period is transmitted to the mobility management entity of the first network via a home subscriber server of the first network.

According to an example embodiment of the fifth aspect, the default network priority data comprises a subscribed radio access technology or frequency selection policy index, and the auxiliary network priority data comprises an authorized radio access technology or frequency selection policy index.

According to an example embodiment of the fifth aspect, the first network comprises an evolved packet core network, and/or the second network comprises a 5G core network.

According to a sixth aspect, a method may comprise: determining, by a second network, default network priority data indicative of a priority for accessing access network resources by a device; configuring auxiliary network priority data for overriding the default network priority data; and transmitting the auxiliary network priority data to a first network.

According to an example embodiment of the sixth aspect, the method may further comprise: determining a validity period for the auxiliary network priority data; and transmitting an indication of the validity period to the first network.

According to an example embodiment of the sixth aspect, the method is performed by an access and mobility management function of the second network, and at least one of the auxiliary network priority data and the indication of the validity period is transmitted to the first network via a unified data management function of the second network.

According to an example embodiment of the sixth aspect, at least one of the auxiliary network priority data and the indication of the validity period is transmitted to a mobility management entity of the first network.

According to an example embodiment of the sixth aspect, the method may further comprise: transmitting at least one of the default network priority data, the auxiliary network priority data, and the indication of the validity period to another access and mobility management function of the second network upon mobility of the device from the access and mobility management function of the second network to the other access and mobility management function of the second network.

According to an example embodiment of the sixth aspect, at least one of the auxiliary network priority data and the indication of the validity period is transmitted to the mobility management entity of the first network via a home subscriber server of the first network.

According to an example embodiment of the sixth aspect, the default network priority data comprises a subscribed radio access technology or frequency selection policy index, and the auxiliary network priority data comprises an authorized radio access technology or frequency selection policy index.

According to an example embodiment of the sixth aspect, the first network comprises an evolved packet core network, and/or the second network comprises a 5G core network According to a seventh aspect a computer program or a computer program product may comprise instructions for causing an apparatus to perform at least the following: determining, by a second network, default network priority data indicative of a priority for accessing access network resources by a device; configuring auxiliary network priority data for overriding the default network priority data; and transmitting the auxiliary network priority data to a first network. The computer program may further comprise instructions for causing the apparatus to perform any example embodiment of the method of the sixth aspect.

According to an eighth aspect an apparatus may comprise: means for determining, by a second network, default network priority data indicative of a priority for accessing access network resources by a device; means for configuring auxiliary network priority data for overriding the default network priority data; and means for transmitting the auxiliary network priority data to a first network. The apparatus may further comprise means for performing any example embodiment of the method of the sixth aspect.

According to a ninth aspect, an apparatus may comprise at least one processor; and at least one memory including computer program code; the at least one memory and the computer program code configured to, with the at least one processor, cause the apparatus at least to: receive auxiliary network priority data configured by a second network to override default network priority data indicative of a priority for accessing access network resources by a device; and transmit the auxiliary network priority data to a first network.

According to an example embodiment of the ninth aspect, the at least one memory and the computer code are further configured to, with the at least one processor, cause the apparatus to: determine a validity period for the auxiliary network priority data or receive an indication of the validity period for the auxiliary network priority data; and transmit an indication of the validity period to the first network.

According to an example embodiment of the ninth aspect, the apparatus comprises a unified data management function of the second network.

According to an example embodiment of the ninth aspect, at least one of the default network priority data, the auxiliary network priority data, and the indication of the validity period is transmitted to a mobility management entity of the first network.

According to an example embodiment of the ninth aspect, at least one of the default network priority data, the auxiliary network priority data, and the indication of the validity period is transmitted to the mobility management entity of the first network via a home subscriber server of the first network.

According to an example embodiment of the ninth aspect, at least one of the auxiliary network priority data and the indication of the validity period is received from an access and mobility management function of the second network.

According to an example embodiment of the ninth aspect, the default network priority data comprises a subscribed radio access technology or frequency selection policy index, and the auxiliary network priority data comprises an authorized radio access technology or frequency selection policy index.

According to an example embodiment of the ninth aspect, the first network comprises an evolved packet core network, and/or the second network comprises a 5G core network.

According to a tenth aspect, a method may comprise: receiving auxiliary network priority data configured by a second network to override default network priority data indicative of a priority for accessing access network resources by a device; and transmitting the auxiliary network priority data to a first network.

According to an example embodiment of the tenth aspect, the method may further comprise: determining a validity period for the auxiliary network priority data or receiving an indication of the validity period for the auxiliary network priority data; and transmitting an indication of the validity period to the first network.

According to an example embodiment of the tenth aspect, the method may be performed by a unified data management function of the second network.

According to an example embodiment of the tenth aspect, at least one of the default network priority data, the auxiliary network priority data, and the indication of the validity period is transmitted to a mobility management entity of the first network.

According to an example embodiment of the tenth aspect, at least one of the default network priority data, the auxiliary network priority data, and the indication of the validity period is transmitted to the mobility management entity of the first network via a home subscriber server of the first network.

According to an example embodiment of the tenth aspect, at least one of the auxiliary network priority data and the indication of the validity period is received from an access and mobility management function of the second network.

According to an example embodiment of the tenth aspect, the default network priority data comprises a subscribed radio access technology or frequency selection policy index, and the auxiliary network priority data comprises an authorized radio access technology or frequency selection policy index.

According to an example embodiment of the tenth aspect, the first network comprises an evolved packet core network, and/or the second network comprises a 5G core network.

According to an eleventh aspect, a computer program or a computer program product may comprise instructions for causing an apparatus to perform at least the following: receiving auxiliary network priority data configured by a second network to override default network priority data indicative of a priority for accessing access network resources by a device; and transmitting the auxiliary network priority data to a first network. The computer program or computer program product may further comprise instructions for causing the apparatus to perform any example embodiment of the method of the tenth aspect.

According to a twelfth aspect, an apparatus may comprise: means for receiving auxiliary network priority data configured by a second network to override default network priority data indicative of a priority for accessing access network resources by a device; and means for transmitting the auxiliary network priority data to a first network. The apparatus may further comprise means for performing any example embodiment of the method of the tenth aspect.

According to a thirteenth aspect, an apparatus may comprise at least one processor; and at least one memory including computer program code; the at least one memory and the computer program code configured to, with the at least one processor, cause the apparatus at least to: receive auxiliary network priority data configured by a second network to override default network priority data indicative of a priority for accessing access network resources by a device; and transmit the auxiliary network priority data to a mobility management entity of a first network.

According to an example embodiment of the thirteenth aspect, the at least one memory and the computer code are further configured to, with the at least one processor, cause the apparatus to: determine a validity period for the auxiliary network priority data or receive an indication of the validity period for the auxiliary network priority data; and transmit an indication of the validity period to the mobility management entity of the first network.

According to an example embodiment of the thirteenth aspect, the apparatus comprises a home subscriber server of the first network.

According to an example embodiment of the thirteenth aspect, at least one of the auxiliary network priority data and the indication of the validity period is received from an access and mobility management function of the second network.

According to an example embodiment of the thirteenth aspect, at least one of the default network priority data, the auxiliary network priority data, and the indication of the validity period is received from/via a unified data management function of the second network.

According to an example embodiment of the thirteenth aspect, the default network priority data comprises a subscribed radio access technology or frequency selection policy index, and the auxiliary network priority data comprises an authorized radio access technology or frequency selection policy index.

According to an example embodiment of the thirteenth aspect, the first network comprises an evolved packet core network, and/or the second network comprises a 5G core network.

According to a fourteenth aspect, a method may comprise: receiving auxiliary network priority data configured by a second network to override default network priority data indicative of a priority for accessing access network resources by a device; and transmitting the auxiliary network priority data to a mobility management entity of a first network.

According to an example embodiment of the fourteenth aspect, the method may further comprise: determining a validity period for the auxiliary network priority data or receiving an indication of the validity period for the auxiliary network priority data; and transmitting an indication of the validity period to the mobility management entity of the first network.

According to an example embodiment of the fourteenth aspect, the method may be performed by a home subscriber server of the first network.

According to an example embodiment of the fourteenth aspect, at least one of the auxiliary network priority data and the indication of the validity period is received from an access and mobility management function of the second network.

According to an example embodiment of the fourteenth aspect, at least one of the default network priority data, the auxiliary network priority data, and the indication of the validity period is received from/via a unified data management function of the second network.

According to an example embodiment of the fourteenth aspect, the default network priority data comprises a subscribed radio access technology or frequency selection policy index, and the auxiliary network priority data comprises an authorized radio access technology or frequency selection policy index.

According to an example embodiment of the fourteenth aspect, the first network comprises an evolved packet core network, and/or the second network comprises a 5G core network.

According to a fifteenth aspect, a computer program or a computer program product may comprise instructions for causing an apparatus to perform at least the following: receiving auxiliary network priority data configured by a second network to override default network priority data indicative of a priority for accessing access network resources by a device; and transmitting the auxiliary network priority data to a mobility management entity of a first network. The computer program or computer program product may further comprise instructions for causing the apparatus to perform any example embodiment of the method of the fourteenth aspect.

According to a sixteenth aspect, an apparatus may comprise: means for receiving auxiliary network priority data configured by a second network to override default network priority data indicative of a priority for accessing access network resources by a device; and means for transmitting the default network priority data and the auxiliary network priority data to a mobility management entity of a first network. The apparatus may further comprise means for performing any example embodiment of the method of the fourteenth aspect.

Any example embodiment may be combined with one or more other example embodiments. Many of the attendant features will be more readily appreciated as they become better understood by reference to the following detailed description considered in connection with the accompanying drawings.

DESCRIPTION OF THE DRAWINGS

The accompanying drawings, which are included to provide a further understanding of the example embodiments and constitute a part of this specification, illustrate example embodiments and together with the description help to understand the example embodiments. In the drawings:

FIG. 4 illustrates an example of a method for applying network priority data;

FIG. 5 illustrates an example of a method for signalling network priority data;

FIG. 6 illustrates an example of a method for delivering network priority data; and FIG. 7 illustrates an example of another method for delivering network priority data.

Like references are used to designate like parts in the accompanying drawings.

DETAILED DESCRIPTION

Reference will now be made in detail to example embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Different networks may be configured with different processes for accessing access network resources of a network, or, for mobility within a network or between networks. For example a 5G core (5GC) network may apply a radio access technology (RAT)/frequency selection policy index (RFSP) to determine whether a particular UE should access the 5GC by the next generation (5G) radio access network (NG-RAN) or whether the UE should access another network, for example the evolved packet core (EPC) of LTE via the evolved universal terrestrial radio access network (E-UTRAN). Application of network specific procedures for radio access or mobility may cause undesired behaviour if different networks do not sufficiently co-operate in selection of network for the UE. Example embodiments of the present disclosure improve network selection by signalling relevant information between core networks.

According to an example embodiment, an apparatus may receive, at a first network from a second network, default network priority data indicative of a priority for accessing access network resources by a device. The apparatus may further receive, from the second network, auxiliary network priority data configured by the second network to override the default network priority data. The apparatus may cause configuration of network access for the device based on the auxiliary network priority data. The apparatus may comprise or be configured to implement a mobility management entity (MME) of the EPC and the default and/or auxiliary network priority data may be received from an access and mobility management function (AMF) of the 5GC, for example via a unified data management (UDM) function of the 5GC and a home subscriber server (HSS) of the EPC.

Figure 1:
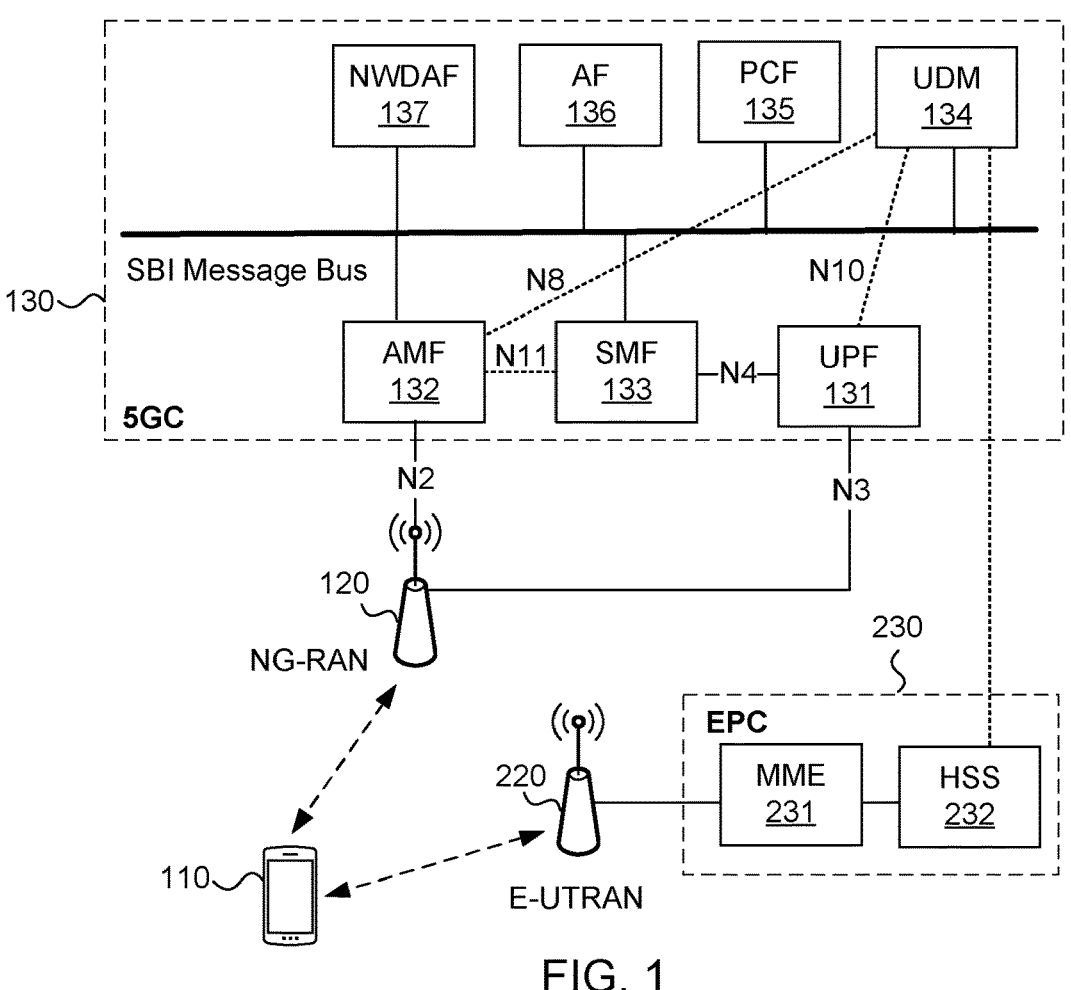
FIG. 1 illustrates an example of a communication network.

FIG. 1 illustrates an example embodiment of a communication network. The communication network may comprise one or more devices, which may be also referred to as client nodes, user nodes, or user equipment (UE). An example of a device is UE 110, which may communicate with one or more access nodes or access points, represented in this example by 5$^{th}$ generation access node (gNB) 120 and 4$^{th}$ generation (LTE) access node (eNB) 220, over wireless radio channel(s). Communications between UE 110 and gNB 120, or UE 110 and eNB 220, may be bidirectional and hence any of these entities may be configured to operate as a transmitter and/or a receiver. Transmissions from gNB 120 or eNB 220 to UE 110 may be referred to as downlink transmissions. Transmissions from UE 110 to gNB 120 or eNB 220 may be referred to as uplink transmissions.

Access nodes, such as gNB 120 or eNB 220, may be also called base stations or a radio access network (RAN) nodes and they may be part of a RAN between a respective core network and UE 110. For example, gNB 120 may be part of an NG-RAN enabling UE 110 to access 5GC 130. And, eNB 220 may be part of E-UTRAN enabling UE 110 to access EPC 230. NG-RAN and E-UTRAN are provided as examples of different radio access technologies (RAT). Network elements, such as gNB 120, eNB 220, or network functions, may be also referred to as network nodes or network devices. Although depicted as a single device, a network node may not be a stand-alone device, but for example a distributed computing system coupled to a remote radio head. For example, a cloud radio access network (cRAN) may be applied to split control of wireless functions to optimize performance and cost.

A core network may comprise various core network elements, node, functions, or entities. The access nodes of the NG-RAN (e.g. gNB 120) may for example communicate with one or more user plane functions 131 (UPF) of the 5GC 130, for example over an N3 interface. UPF 131 may be configured to handle user data part of a communication session. UPF 131 may provide an interconnect point between the NG-RAN and a data network. For example, UPF 131 may be configured to handle encapsulation and decapsulation of user plane protocol(s), such as for example the GPRS (general packet radio service) tunnelling protocol for the user plane (GTP-U).

5GC 130 may further comprise an access and mobility management function (AMF) 132, which may be configured to receive connection and session request related information from UE 110 (via NG-RAN). AMF 132 may be responsible for connection and mobility management. However, AMF 132 may be configured to delegate any session management related tasks to a session management function (SMF) 133, for example based on information about suitable SMF(s) 133 retrieved from a network repository function (NRF) (not shown). NRF may be configured to enable network functions to register their services and discover services offered by other network functions. Based on the information received from NRF, or locally configured at AMF 132, AMF 132 may select an SMF instance and an SMF service for a particular UE 110. Selection of the SMF instance may be for example based on subscription information associated with the UE 110 retrieved from a unified data management (UDM) function 134, access technologies supported or being used by UE 110, or the like.

UDM 134 may be configured to manage user/subscriber data, for example data for access authorization, user registration, and data network profiles. UDM 134 may co-operate with a user data repository (UDR) configured to store for example customer profile information, authentication information, encryption keys, or the like.

Policy and charging control function (PCF) 135 may be configured to manage policy rules associated with, for example, network slicing, roaming, or mobility management. PCF 135 enables the network operator to configure rules for managing subscribers, applications, and network resources.

Application function (AF) 136 may enable representation of applications that interact with the 5GC 130. AF 136 may interact with the network functions directly or via a network exposure function (NEF).

Network data analytics function (NWDAF) 137 may provide network analysis information related to various functions at the network, such as for example the load level of a particular network slice, key performance indicators (KPI), or quality of experience (QoE) metrics.

The network functions may communicate over a service based interface (SBI) bus, which may be accessible to the network functions. Point-to-point interfaces between individual network functions, such as for example an N8 interface between AMF 132 and UDM 134, an N10 interface between SMF 133 and UDM 134, and an N11 interface between AMF 132 and SMF 133, may be implemented over the SBI message bus. For sake of simplicity, only a few examples of point-to-point interfaces are illustrated in FIG. 1.

Access nodes of the E-UTRAN (e.g. eNB 220) may communicate with EPC 230, for example the mobility management entity (MME) 231. MME 231 may provide mobility and session management services at EPC 230, such as for example subscriber authentication, ciphering and integrity protection, roaming, and handovers to/from other networks (e.g. 5GC 130). MME 231 may further support UE-to-network session handling, e.g., signalling procedures for establishing packet data sessions for UE 110. MME 231 may further handle idle terminal location management, e.g., tracking area updates for UE 110. MME 231 may therefore provide, at EPC 230, functions similar to AMF 132 of 5GC 130.

EPC 230 may further comprise a home subscriber server (HSS) 232, which may handle user identification and addressing (e.g. by the international mobile subscriber identifier, IMSI) and store user profile information, for example related to subscription of the user. HSS 232 may therefore provide, at EPC 230, functions similar to UDM 134 of 5GC 130.

5GC 130 may be configured to provide access and mobility management (AM) related policies to AMF 132 through PCF 135. The access and mobility related policy control information may include for example one or more of the following: an aggregated maximum bit rate (AMBR), service area restrictions (SAR), or RAT/frequency selection policy (RFSP) index. RFSP index may be a UE-specific parameter and applicable to a plurality of radio bearers for that specific UE. PCF 135 may use various input data such as for example location of UE 110, time of day, information provided by other network functions, e.g. an application function request from AF 136 to change service coverage, and/or network analytics from NWDAF 137, to determine an appropriate AM policy for UE 110.

However, at EPC 230, no framework may be available for providing such policies to MME 231. Policies like RFSP index may be provisioned as part of the subscriber profile in HSS 232 and MME 231 may use information received from HSS 232 during the attach procedure of UE 110.

As deployment of 5G networks continues, operators may face challenges in co-operation between 4G and 5G networks. To promote use of 5G network and services, operators may provision subscribers with 5G capable UEs and have 5G prioritized in their subscription data. This may be achieved for example by configuring network priority data, e.g. a Subscribed RFSP Index value, that indicates 5G to have higher priority than 4G.

In 5GC 130, however, PCF 135 may configure network priority data, e.g. an Authorized RFSP Index value, that is different from the Subscribed RFSP Index. Subscribed RFSP Index may be seen as default network priority data that is indicative of a default priority for accessing access network resources, e.g., priority for the 4G or the 5G network. Authorized RFSP Index is an example of auxiliary network priority data. The auxiliary network priority data may be supplementary to the default network priority data (e.g. the Subscribed RFSP Index) and the auxiliary network priority data, once configured, may be used instead of the default priority data. Authorized RFSP Index may be therefore configured to override the Subscribed RFSP Index, at least temporarily. Authorized RFSP Index and Subscribed RFSP Index may for example take values between 1 to 256 and therefore be represented by eight bits.

Authorized RFSP Index may be used by PCF 135 for example for adjusting the RFSP index in order to direct UE 110 from 5G to 4G according to dynamically varying network situations, for example:

Based on various analytics and prediction results received from NWDAF 137 (e.g. network congestion in 5G), PCF 135 may move some UEs to 4G access.

Based on a subscriber category, PCF 135 may move some 5G non-prioritized UEs to 4G access.

Based on a request from AF 136 (e.g. throughput requirements), PCF 135 may decide to move requested UE(s) from 5G to 4G.

It is to be noted that, with the RFSP Index, the 5G network (e.g. PCF 135 and AMF 132) may provide guidance to the RAN (e.g. gNB 120). The decision to move UE 110 from 5G access to 4G access, or vice versa, may be made at the RAN taking into account the RSFP index received from AMF 132. Authorized RFSP Index and/or Subscribed RFSP Index may be specific for a particular UE. Therefore, different UE's may be configured with different RFSP indices.

When UE 110 is moved to EPC 230, MME 231 may choose the applicable RFSP Index based on the Subscribed RFSP Index, locally configured operator policies, and/or UE-related context information available at MME 231. If UE 110 is prioritized to use 5G, for example as per the Subscribed RFSP Index, MME 231 may provide RFSP Index indicative of a 5G prioritized access to eNB 220, even if an Authorized RFSP Index prioritizing 4G access were configured at 5GC 130. This may possibly cause a ping-pong situation between 5GC 130 and EPC 230, where 5GC 130 keeps sending UE 110 to EPC 230 based on the Authorized RFSP Index configured at 5GC 130, while MME 231 continues to kick UE 110 back to 5GC 130, because it only has the Subscribed RFSP Index and it is not aware of the configuration of the Authorized RFSP Index at 5GC 130.

Therefore, example embodiments of the present disclosure provide mechanisms and enhancements for AM policy control concerning transfer of a UE between two (core) networks, for example from 5GC 130 to EPC 230, or vice versa.

Example embodiments therefore address the challenges due to unavailability of information about dynamically configured AM policy changes at another network. For example, 5GC 130 may be configured to inform EPC 230 when UE 110 is moved to 4G access from 5G access due to a dynamically arrived Authorized RFSP Index value(s). Example embodiments enable this without introduction of a new interface from MME 231 to PCF 135 and therefore provide a backwards compatible solution.

Even though some example embodiments have been described using the 4G and 5G networks as an example, it is appreciated that example embodiments presented herein are not limited to these example networks and may be applied in any present or future communication networks, for example other type of cellular networks, short-range wireless networks, broadcast networks. In general, example embodiments address signalling network priority data between different networks. These networks may be associated with different radio access technologies. The networks may be functionally or logically separate, but in some example embodiments the network functions or entities of the different networks may be implemented within same device(s). The different networks may share information via a network interconnection interface, such as for example an interface between UDM 134 and HSS 232. Also, operations described with reference to particular network functions, entities, or devices, such as for example AMF 132, UDM 134, HSS 232, and/or MME 231 may be also implemented within other network functions, entities, or devices.

Figure 2:
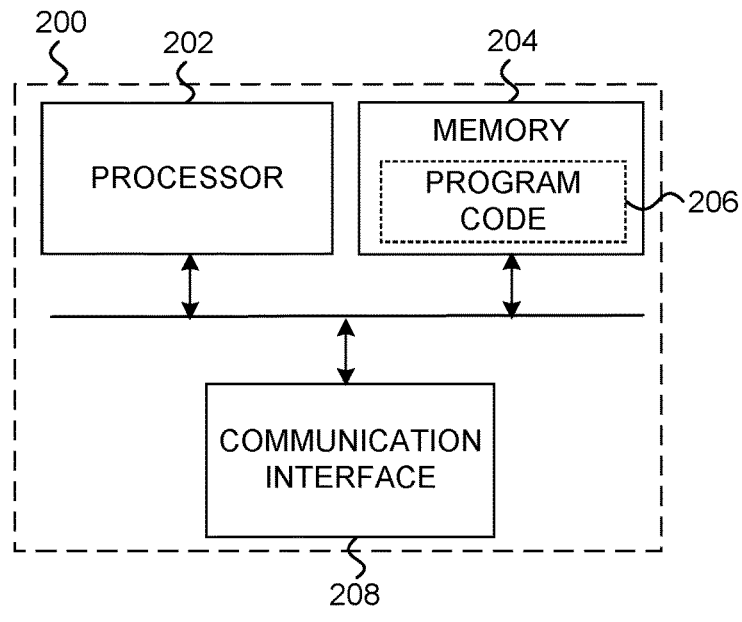
FIG. 2 illustrates an example of an apparatus configured to practise one or more example embodiments.

FIG. 2 illustrates an example embodiment of an apparatus 200, for example UE 110, gNB 120, eNB 220, a device implementing operations of one or more network functions or entities, or a component or a chipset of any of the mentioned devices. Apparatus 200 may comprise at least one processor 202. The at least one processor 202 may comprise, for example, one or more of various processing devices or processor circuitry, such as for example a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

Apparatus 200 may further comprise at least one memory 204. The at least one memory 204 may be configured to store, for example, computer program code or the like, for example operating system software and application software. The at least one memory 204 may comprise one or more volatile memory devices, one or more non-volatile memory devices, and/or a combination thereof. For example, the at least one memory 204 may be embodied as magnetic storage devices (such as hard disk drives, floppy disks, magnetic tapes, etc.), optical magnetic storage devices, or semiconductor memories (such as mask ROM, PROM (programmable ROM), EPROM (erasable PROM), flash ROM, RAM (random access memory), etc.).

Apparatus 200 may further comprise a communication interface 208 configured to enable apparatus 200 to transmit and/or receive information to/from other devices, functions, or entities. In one example, apparatus 200 may use communication interface 208 to transmit or receive information over the SBI message bus of 5GC 130, internal interfaces of EPC 230, or a network interconnection interface between different networks (e.g. 5GC 130 and EPC 230).

When apparatus 200 is configured to implement some functionality, some component and/or components of apparatus 200, such as for example the at least one processor 202 and/or the at least one memory 204, may be configured to implement this functionality. Furthermore, when the at least one processor 202 is configured to implement some functionality, this functionality may be implemented using program code 206 comprised, for example, in the at least one memory 204.

The functionality described herein may be performed, at least in part, by one or more computer program product components such as for example software components. According to an embodiment, the apparatus comprises a processor or processor circuitry, such as for example a microcontroller, configured by the program code when executed to execute the embodiments of the operations and functionality described. A computer program or a computer program product may therefore comprise instructions for causing, when executed, apparatus 200 to perform the method(s) described herein. Alternatively, or in addition, the functionality described herein can be performed, at least in part, by one or more hardware logic components. For example, and without limitation, illustrative types of hardware logic components that can be used include Field-programmable Gate Arrays (FPGAs), application-specific Integrated Circuits (ASICs), application-specific Standard Products (ASSPs), System-on-a-chip systems (SOCs), Complex Programmable Logic Devices (CPLDs), Graphics Processing Units (GPUs).

Apparatus 200 comprises means for performing at least one method described herein. In one example, the means comprises the at least one processor 202, the at least one memory 204 including program code 206 configured to, when executed by the at least one processor, cause the apparatus 200 to perform the method.

Apparatus 200 may comprise a computing device such as for example an access point, a base station, a server, a network device, or the like. Although apparatus 200 is illustrated as a single device it is appreciated that, wherever applicable, functions of apparatus 200 may be distributed to a plurality of devices, for example to implement example embodiments as a cloud computing service.

Figure 3:
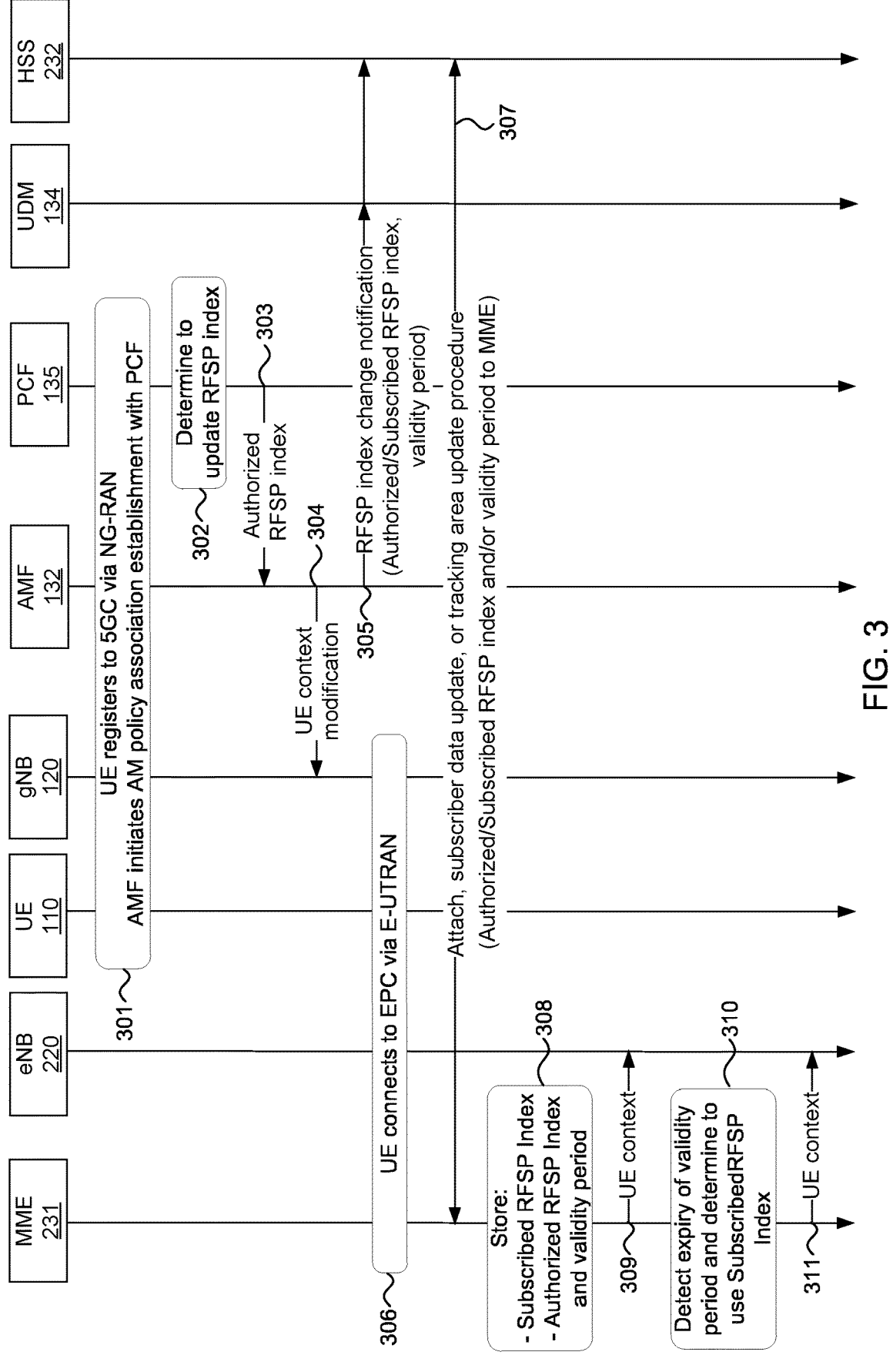
FIG. 3 illustrates an example of a procedure for signalling network priority data between core networks.

FIG. 3 illustrates an example of a procedure for signalling network priority data between core networks. A first (core) network is represented in this example by EPC 230. A second (core) network is represented in this example by 5GC 130.

At operation 301, UE 110 may register to 5GC 130 via the NG-RAN (e.g. gNB 120). AMF 132 may initiate AM policy association establishment with PCF 135. For example, if AMF 132 has not yet obtained AM policy for UE 110, or if the AM policy is not valid anymore, AMF 132 may request PCF 135 to apply operator policies for UE 110.

At operation 302, PCF 135 may determine to update network priority information, for example the RFSP index. PCF 135 may for example determine to set an Authorized RFSP Index for UE 110, in addition to a Subscribed RFSP Index configured for UE 110. AMF 132 may receive the Subscribed RFSP Index from UDM 134 during registration procedure of UE 110. AMF 132 may include this Subscribed RFSP Index in AM Policy establishment request to PCF 135. PCF 135 may then provide the Authorized RFSP Index AMF 132. In general, AFM 134 may determine the Subscribed RFSP Index, for example by receiving it from UDM 134.

At operation 303, PCF 135 may transmit the Authorized RFSP Index to AMF 132, for example in an AM policy establishment response message or an AM policy association modification message. In response to receiving the Authorized RFSP Index from PCF 135, AMF 132 may provision the Authorized RFSP Index to the NG-RAN instead of the Subscribed RFSP Index. AMF 132 may further determine that a notification is to be sent to the 4G network, e.g. to HSS 232 via UDM 134. AMF 132 may have for example created an implicit subscription (e.g. based on operator policies and local configuration) to notify UDM 134 about the change in network access priorities. Alternatively, UDM 134 may provide notification endpoints to AMF 132 during the registration procedure. AMF 132 may further determine a validity period (e.g. a timer) for the configured Authorized RFSP Index. Alternatively, the validity period may be determined by UDM 134, HSS 232, or MME 231. The validity period enables to control the duration of applying the Authorized RFSP Index, which is in this case an example of temporary auxiliary network priority data.

At operation 304, AMF 132 may provide the Authorized RFSP Index to gNB 120, for example in a UE context modification request. This may result in configuration of the Authorized RFSP Index for UE 110 at 5GC 130. Configuration of the Authorized RFSP Index may override a previously configured Subscribed RFSP Index. Authorized RFSP Index may be therefore subsequently used at 5GC 130 instead of the Subscribed RFSP Index for guiding UE 110 to access a desired network.

At operation 305, AMF 132 may transmit an RFSP index change notification to EPC 230, for example to HSS 232, optionally via UDM 134. The notification may comprise the Authorized RFSP Index, optionally along with the Subscribed RFSP Index. The notification may be transmitted as any suitable control message(s). The notification may be UE-specific, e.g., sent for each UE separately. It is however possible that UDM 134 stores or gets the Subscribed RFSP Index from a subscriber database. The information of the Subscribed RFSP Index may be therefore locally retrieved by UDM 134. In this case, AMF 134 may not transmit the Subscribed RFSP Index to UDM 134.

In general, AMF 132 may transmit, to EPC 230, default network priority data (e.g. Subscribed RFSP Index) and/or auxiliary (e.g. temporary) network priority data (e.g. Authorized RFSP Index). AMF 132 may also transmit an indication of the validity period to EPC 230, for example as part of the same notification. Network priority data may be also called network access priority data. Even though the default and auxiliary network priority data are represented throughout the description by the examples of Subscribed RFSP Index and Authorized RFSP Index, respectively, they may be provided in any suitable format. For example, network priority data may comprise a priority value within a scale of 1 to 5, a lower priority value being indicative of a higher priority. The network priority data may be indicative of a priority for accessing access network resources, e.g. resources of the E-UTRAN or the NG-RAN, for UE 110. These network resources may for example refer to time and/or frequency transmission resources provided by the relevant RAN.

UDM 134 may receive the Authorized RFSP Index, the Subscribed RFSP Index, and/or the indication of the validity period. UDM 134 may transmit this data to EPC 230, for example MME 231, optionally via HSS 232. It is however possible that HSS 232 stores the Subscribed RFSP Index or gets the Subscribed RFSP Index from a subscriber database. The information of the Subscribed RFSP Index may be therefore locally or remotely retrieved by HSS 232. In this case, UDM 134 may not transmit the Subscribed RFSP Index to HSS 232. It is also possible that UDM 134 stores the Subscribed RFSP Index or gets it from a subscriber database. The information of the Subscribed RFSP Index may be therefore locally or remotely retrieved by UDM 134. In this case UDM 134 may not receive the Subscribed RFSP Index form AMF 132.

It is noted that UDM 134 and HSS 232 may be co-located, for example within a single device. In case of such combined UDM/HSS deployment, signaling between UDM 134 and HSS 232 may not be needed or it may be handled in an implementation specific (non-standardized) manner. If UDM 134 and HSS 232 are deployed separately, UDM 134 may forward the notification from AMF 132, or relevant content thereof, to HSS 232. If UE 110 is already registered on a MME when HSS 232 receives the RFSP index change notification at operation 305, HSS 232 may perform operation 307 before UE 110 connects to EPC 230 via the E-UTRAN (operation 306). This may happen for example in case of a dual-registration mode, where UE 110 may handle independent registrations for 5GC 130 and EPC 230 using separate radio resource control (RRC) connections. Otherwise, HSS 232 may perform operation 307 when UE 110 registers to EPC 230 at operation 306.

At operation 306, UE 110 may connect to EPC 230 via the E-UTRAN (e.g. eNB 220). UE 110 may connect to EPC 230 for example in accordance with an attach or tracking area update, or based on a service request sent by UE 110 to MIME 231.

At operation 307, MME 231 may receive the Authorized RFSP Index, the Subscribed RFSP Index, and/or the indication of the validity period. This information may be received from 5GC 130, for example via HSS 232 or via AMF 132, for example over an N26 interface (when the N26 interface has been set up by the network operator between MME(s) and AMF(s)). It is however possible that information about the Subscribed RFSP Index is already available at EPC 230, for example at HSS 232. If no indication of the validity period is received, MME 231 may determine such validity period itself. This enables local control of the duration for applying the Authorized RFSP Index at EPC 230.

The Authorized RFSP Index, the Subscribed RFSP Index, and/or the indication of the validity period may be received during, or generally in association with, an attach or tracking area update procedure of UE 110 to EPC 230, e.g. over the N26 interface from AMF 132. Alternatively, if UE 110 had already attached to MME 231, e.g. before the UDM 134 or HSS 232 received the notification from AMF 132 (cf. operation 305), HSS 232 may transmit this signalling during, or in association with, a subscriber data update procedure (of UE 110) towards EPC 230, e.g. as a consequence of operation 305. HSS 232 may for example transmit a standalone insert subscriber data command to MME 231, in order to update the subscriber data in MME 231 with the Authorized RFSP Index.

At operation 308, MME 231 may store the Authorized RFSP Index, the Subscribed RFSP Index, and/or the validity period. MME 231 may initiate to monitor the validity period. MME 231 may for example initiate a timer with an initial value corresponding to the duration of the validity period. MME 231 may determine to apply the Authorized RFSP Index for configuration of network access for UE 110 during the validity period, e.g. a pre-defined duration corresponding to the initial value of the timer. The timer may be used to determine the time elapsed since UE 110 was moved by 5GC 130 to 4G access.

At operation 309, MME 231 may transmit UE context to eNB 220, for example as a UE context creation request or a UE context modification request to eNB 220. The UE context creation request or modification request may comprise the Authorized RFSP Index to be used for configuring network access for UE 110. Therefore, MME 231 may configure, or cause configuration of, network access for UE 110 based on the Authorized RFSP Index. MME 231 may cause the configuration of the network access for UE 110 by transmitting the Authorized RFSP Index to eNB 220, for example in the UE context modification request. The eNB 220 may then configure radio access for UE 110 accordingly. The applicable RFSP index may be for example mapped at eNB 220, or in general the E-UTRAN, to a specific radio resource management (RMM) strategy for configuring the desired type of network access for UE 110.

Before the validity period is expired, it is possible that UE 110 gets services from a different MME (e.g. due to mobility). MME 231, acting in this case as a source MME, may transfer UE context information to the other MME (target MME) to inform the other MME about the applicable network priority data. The UE context information may include the Authorized RFSP Index and optionally a remaining validity period (e.g. current value of the timer). MME 231 may therefore transmit, to a target MME, the Authorized RFSP Index, the Subscribed RFSP Index, and/or an indication of the remaining validity period. In response to receiving this information, the target MME may configure, or cause configuration of, network access for UE 110 based on the Authorized RFSP Index, the Subscribed RFSP Index, and/or the remaining validity period, similar to MME 231. The target MME may for example resume the timer from the value indicated by MME 231. The value of the timer may correspond to the value of the timer at the time of mobility from (source) MME 231 to the target MME. For example, if remaining timer value was 2 minutes when MME 231 transferred UE context to the target MME, the target MME may continue monitoring the validity period from the timer value of 2 minutes.

According to another mobility related aspect, AMF 132 may transmit the Authorized RFSP Index, the Subscribed RFSP Index, and/or an indication of the validity period to another AMF (target AMF) of 5GC 130, for example upon mobility of UE 110 to the other AMF. This inter-AMF mobility may happen at any suitable time during the procedure of FIG. 3, for example before UE 110 connects to EPC 230 via the E-UTRAN.

At operation 310, MME 231 may detect expiry of the validity period, for example by detecting the timer to reach zero. In response, MME 231 may determine to use the Subscribed RFSP Index instead of the Authorized RFSP Index.

At operation 311, MME 231 may reconfigure, or cause reconfiguration of, network access for UE 110 based on the Subscribed RFSP Index, for example by transmitting a UE context modification request comprising the Subscribed RFSP Index to eNB 220. MME 231 may decide to use the Subscribed RFSP Index based on operator policies, e.g. after a fixed duration of time, and then send the UE context modification request to eNB 220 with the Subscribed RFSP Index information. Example embodiments therefore enable sharing of auxiliary network priority data at least temporarily configured at one network with another network. This enables to improve network selection at the other network.

FIG. 4 illustrates an example of a method for applying network priority data. The method may be implemented for example at MME 231.

At 401, the method may comprise receiving, at a first network, default network priority data indicative of a priority for accessing access network resources by a device.

At 402, the method may comprise receiving, from a second network, auxiliary network priority data configured by the second network to override the default network priority data.

At 403, the method may comprise causing configuration of network access for the device based on the auxiliary network priority data.

FIG. 5 illustrates an example of a method for signalling network priority data. The method may be implemented for example at AMF 132.

At 501, the method may comprise determining, by a second network, default network priority data indicative of a priority for accessing access network resources by a device.

At 502, the method may comprise configuring auxiliary network priority data for overriding the default network priority data.

At 503, the method may comprise transmitting the auxiliary network priority data to a first network.

FIG. 6 illustrates an example of a method for delivering network access priority data. The method may be implemented for example at UDM At 601, the method may comprise storing or getting from a subscriber database, at a second network, default network priority data indicative of a priority for accessing access network resources by a device.

At 602, the method may comprise receiving auxiliary network priority data configured by the second network to override the default network priority data.

At 603, the method may comprise transmitting the auxiliary network priority data to the first network.

FIG. 7 illustrates an example of another method for delivering network access priority data. The method may be implemented for example in at HSS 232.

At 701, the method may comprise storing or getting from a subscriber database, at a first network, default network priority data indicative of a priority for accessing access network resources by a device.

At 702, the method may comprise receiving auxiliary network priority data configured by a second network to override the default network priority data.

At 703, the method may comprise transmitting the default network priority data and the auxiliary network priority data to a mobility management entity of the first network.

It is to be understood that the first network and the second network, as used throughout this document, shall not be understood as restricting the application of the example embodiments to the case where AMF 132 and gNB 120 on one side, and MME 231 and eNB 220 on another side, belong to different organizations (e.g. public land mobile network (PLMN) operators). Such examples just depict that the network deployment may have 4G and 5G network logical capabilities that are separate. The first and second networks may therefore belong to same PLMN or different PLMNs. In the latter case, the different PLMNs may be operated by different network operators.

Further features of the methods directly result from functionalities of the MME 231, AMF 132, UDM 134, and/or HSS 232, as described throughout the specification and in the appended claims, and are therefore not repeated here. Different variations of the methods may be also applied, as described in connection with the various example embodiments.

An apparatus, such as for example a network device configured to implement one or more network functions or entities, may be configured to perform or cause performance of any aspect of the method(s) described herein. Further, a computer program or a computer program product may comprise instructions for causing, when executed, an apparatus to perform any aspect of the method(s) described herein. Further, an apparatus may comprise means for performing any aspect of the method(s) described herein. According to an example embodiment, the means comprises at least one processor, and memory including program code, the at least one processor, and program code configured to, when executed by the at least one processor, cause performance of any aspect of the method(s).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps or operations of the methods described herein may be carried out in any suitable order, or simultaneously where appropriate. Additionally, individual blocks may be deleted from any of the methods without departing from the scope of the subject matter described herein. Aspects of any of the example embodiments described above may be combined with aspects of any of the other example embodiments described to form further example embodiments without losing the effect sought.

The term 'comprising' is used herein to mean including the method, blocks, or elements identified, but that such blocks or elements do not comprise an exclusive list and a method or apparatus may contain additional blocks or elements.

Although subjects may be referred to as 'first' or 'second' subjects, this does not necessarily indicate any order or importance of the subjects. Instead, such attributes may be used solely for the purpose of making a difference between subjects.

As used in this application, the term 'circuitry' may refer to one or more or all of the following: (a) hardware-only circuit implementations (such as implementations in only analog and/or digital circuitry) and (b) combinations of hardware circuits and software, such as (as applicable):(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims.

As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from scope of this specification.

The invention claimed is:

1. An apparatus for a first network, comprising:
at least one processor; and
at least one memory including computer program code of a mobility management entity, the computer program code, when executed by the at least one processor, causing the apparatus at least to perform operations, the operations comprising:
receiving default network priority data indicative of a priority for access to access network resources by a device;
receiving, from a second network, auxiliary network priority data configured by the second network to override the default network priority data; and
causing configuration of network access for the device based on the auxiliary network priority data.

2. The apparatus according to claim 1, wherein the operations further comprise:
determining a validity period for the auxiliary network priority data; and
causing reconfiguration of network access for the device based on the default network priority data, in response to detecting expiry of the validity period.

3. The apparatus according to claim 2, wherein the determining the validity period comprises:
determining the validity period based on an indication of the validity period received from the second network.

4. The apparatus according to claim 3, wherein operations further comprise:
transmitting at least one of the auxiliary network priority data or an indication of a remaining time of the validity period to a target mobility management entity of the first network, upon mobility of the device from the apparatus to the target mobility management entity.

5. The apparatus according to claim 2, wherein at least one of the default network priority data, the auxiliary network priority data, or the indication of the validity period for the auxiliary network priority data is received from a home subscriber server of the device.

6. The apparatus according to claim 2, wherein at least one of the auxiliary network priority data or the indication of the validity period for the auxiliary network priority data is received from an access and mobility management function of the second network.

7. The apparatus according to claim 2, wherein at least one of the default network priority data, the auxiliary network priority data, or the indication of the validity period for the auxiliary network priority data is received via or from a unified data management function of the second network.

8. The apparatus according to claim 2, wherein at least one of the default network priority data, the auxiliary network priority data, or the indication of the validity period for the auxiliary network priority data is received in association with an attach or tracking area update procedure of the device to the first network or a subscriber data update procedure towards the first network.

9. The apparatus according to claim 1, wherein the default network priority data comprises a subscribed radio access technology or frequency selection policy index, and wherein the auxiliary network priority data comprises an authorized radio access technology or frequency selection policy index configured by the second network.

10. A method of a mobility management entity of a first network, the method comprising:
receiving default network priority data indicative of a priority for access to access network resources by a device;

receiving, from a second network, auxiliary network priority data configured by the second network to override the default network priority data; and causing configuration of network access for the device based on the auxiliary network priority data.

11. The method according to claim 10, further comprising:

determining a validity period for the auxiliary network priority data; and causing reconfiguration of network access for the device based on the default network priority data, in response to detecting expiry of the validity period.

12. The method according to claim 11, wherein the determining the validity period comprises:

determining the validity period based on an indication of the validity period received from the second network.

13. The method according to claim 12, wherein the operations further comprise:

transmitting at least one of the auxiliary network priority data or an indication of a remaining time of the validity period to a target mobility management entity of the first network, upon mobility of the device from the mobility management entity to the target mobility management entity.

14. The method according to claim 11, wherein at least one of the default network priority data, the auxiliary network priority data, or the indication of the validity period for the auxiliary network priority data is received from a home subscriber server of the device.

15. The method according to claim 11, wherein at least one of the auxiliary network priority data or the indication of the validity period for the auxiliary network priority data is received from an access and mobility management function of the second network.

16. The method according to claim 11, wherein at least one of the default network priority data, the auxiliary network priority data, or the indication of the validity period for the auxiliary network priority data is received via or from a unified data management function of the second network.

17. The method according to claim 11, wherein at least one of the default network priority data, the auxiliary network priority data, or the indication of the validity period for the auxiliary network priority data is received in association with an attach or tracking area update procedure of the device to the first network or a subscriber data update procedure towards the first network.

18. The method according to claim 10, wherein the default network priority data comprises a subscribed radio access technology or frequency selection policy index, and wherein the auxiliary network priority data comprises an authorized radio access technology or frequency selection policy index configured by the second network.

19. A non-transitory computer-readable medium storing instructions of a mobility management entity, the instructions, when executed by at least one processor of an apparatus of a first network, causing the apparatus to perform operations, the operations comprising:

receiving default network priority data indicative of a priority for accessing access network resources by a device;

receiving, from a second network, auxiliary network priority data configured by the second network to override the default network priority data; and causing configuration of network access for the device based on the auxiliary network priority data.

20. The non-transitory computer-readable medium according to claim 19, wherein the operations further comprise:

determining a validity period for the auxiliary network priority data; and causing reconfiguration of network access for the device based on the default network priority data, in response to detecting expiry of the validity period.

* * * * *